United States Patent
Kim et al.

(10) Patent No.: US 7,808,991 B2
(45) Date of Patent: Oct. 5, 2010

(54) NETWORK-BASED DATA TRANSPORT ARCHITECTURE

(75) Inventors: Seong-Hwan Kim, Macungie, PA (US);
James Mark Sepko, Coplay, PA (US);
John Sotir, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 1626 days.

(21) Appl. No.: 10/903,953

(22) Filed: Jul. 30, 2004

(65) Prior Publication Data

US 2006/0034268 A1    Feb. 16, 2006

(51) Int. Cl.
*H04L 12/56* (2006.01)
(52) U.S. Cl. .................................................. 370/392
(58) Field of Classification Search ............... 370/349, 370/389, 392, 471, 474
See application file for complete search history.

(56) References Cited

U.S. PATENT DOCUMENTS

| | | | | |
|---|---|---|---|---|
| 4,622,550 A * | 11/1986 | O'Connor et al. ............ | 370/452 |
| 5,280,480 A * | 1/1994 | Pitt et al. ..................... | 370/392 |
| 5,546,444 A * | 8/1996 | Roach et al. ............... | 455/412.2 |
| 5,706,432 A * | 1/1998 | Elko et al. .................. | 709/213 |
| 5,841,970 A * | 11/1998 | Tabuki ........................ | 709/229 |
| 5,873,043 A * | 2/1999 | Comer ........................ | 370/474 |
| 6,151,318 A * | 11/2000 | Woodward et al. .......... | 370/392 |
| 6,198,936 B1 * | 3/2001 | Yang et al. .................. | 370/347 |
| 6,301,257 B1 * | 10/2001 | Johnson et al. ............. | 370/392 |
| 6,426,957 B1 * | 7/2002 | Hauser et al. ............... | 370/389 |
| 6,601,082 B1 * | 7/2003 | Durham et al. ............. | 709/223 |
| 6,631,130 B1 * | 10/2003 | Roy et al. .................... | 370/352 |
| 6,724,728 B1 * | 4/2004 | Manchester et al. ....... | 370/236.2 |
| 6,894,999 B1 * | 5/2005 | Acharya ..................... | 370/352 |
| 7,039,116 B1 * | 5/2006 | Zhang et al. ................ | 709/247 |
| 7,227,844 B1 * | 6/2007 | Hall et al. ................... | 370/242 |
| 7,286,536 B2 * | 10/2007 | Greis et al. ................. | 370/392 |
| 7,327,832 B1 * | 2/2008 | Russell et al. .............. | 370/363 |
| 7,526,569 B2 * | 4/2009 | Nishida et al. ............. | 370/389 |
| 7,567,537 B1 * | 7/2009 | Gurbuz et al. .............. | 370/338 |
| 2001/0012288 A1 * | 8/2001 | Yu ............................. | 370/352 |
| 2002/0034194 A1 * | 3/2002 | Young et al. ................ | 370/498 |
| 2002/0101865 A1 * | 8/2002 | Takagi et al. ............... | 370/360 |
| 2002/0105972 A1 * | 8/2002 | Richter et al. .............. | 370/474 |
| 2002/0181458 A1 * | 12/2002 | Amidan et al. ............. | 370/389 |

(Continued)

*Primary Examiner*—Chirag G Shah
*Assistant Examiner*—Joshua Smith
(74) *Attorney, Agent, or Firm*—Ryan, Mason & Lewis, LLP (57) ABSTRACT

An apparatus for transporting data in a network-based data communication system includes a first network node comprising a first port couplable to at least a second network node for transferring data in a first format between the first and second network nodes. The first network node further includes a processor operatively coupled to the first port, the processor being configurable to receive one or more frames of data and/or transmit one or more frames of data, the frames of data having an overhead processing portion that is otherwise standard. The processor uses only a subset of the overhead processing portion and is configured such that utilizing only the subset of the overhead processing portion of the one or more data frames enables one or more functional blocks to be eliminated from the first network node, the one or more functional blocks being otherwise required for implementing substantially all of the overhead processing portion of the one or more data frames.

22 Claims, 8 Drawing Sheets

U.S. PATENT DOCUMENTS

2003/0120807 A1* 6/2003 Nonomura ................. 709/238
2003/0210677 A1* 11/2003 Grove et al. ................ 370/352
2004/0071224 A1 4/2004 Balay et al.
2004/0213183 A1* 10/2004 Barry et al. ................. 370/335
2005/0180410 A1* 8/2005 Pepenella ................... 370/386
2006/0018286 A1* 1/2006 Ozeki et al. ................. 370/334

* cited by examiner

NETWORK-BASED DATA TRANSPORT ARCHITECTURE

FIELD OF THE INVENTION

The present invention relates generally to communication networks, and more particularly to a network-based data transport architecture for communicating among two or more network nodes.

BACKGROUND OF THE INVENTION

In a network-based communications environment, certain communications standards, such as, for example, a synchronous optical network (SONET) ring architecture, may be employed for supplying connectivity between a relatively large number of users in the network. SONET is a well-known standard for optical telecommunications transport promulgated by the Exchange Carriers Standards Association (ECSA) for the American National Standards Institute (ANSI). The SONET standard is set forth in the document ANSI T1.105-1988, entitled *American National Standard for Telecommunications—Digital Hierarchy Optical Interface Rates and Formats Specification* (September 1988), which is incorporated by reference herein. Additional supplements to the SONET standard, including ANSI T1.106-1988, entitled *Digital Hierarchy Optical Interface Specifications: Single-Mode* (August 1988), and ANSI T1.119-1994, entitled *Information Systems—Synchronous Optical Network (SONET)—Operations, Administrations, Maintenance, and Provisioning (OAM&P)—Communications* (May 1994), are also incorporated by reference herein. Other well-known network configurations, such as, for example, an Ethernet tree architecture, may be similarly employed for connecting a large number of users to a more centralized node in the network.

Unfortunately, the SONET ring architecture, like many other standard network architectures, is costly to implement due, at least in part, to the complex transport overhead required to be fully compliant with the SONET standard. This overhead necessarily increases the amount of hardware and/or software required for implementing SONET, as well as significantly increasing design cycle time. Furthermore, the SONET architecture is not easily expandable without significant provisioning, e.g., adding add/drop multiplexers (ADMs), etc., to the system. Additionally, an Ethernet tree architecture does not provide an adequate level of active transport link status information, and individual Ethernet links are typically of lower capacity compared to links in a SONET architecture.

There exists a need, therefore, for a more cost-effective and less complex network-based data transport architecture that does not suffer from one or more of the problems exhibited by conventional methodologies.

SUMMARY OF THE INVENTION

The present invention meets the above-noted need by providing a mechanism for more cost-effectively transporting data through a network-based communication system. By utilizing only a subset of an overhead processing portion of an otherwise standard synchronous communication protocol, the complexity of the hardware and/or software required for transporting data through the network-based communication system can be significantly reduced, thereby providing a beneficial cost savings.

In accordance with one aspect of the invention, an apparatus for transporting data in a network-based data communication system includes a first network node comprising a first port couplable to at least a second network node for transferring data in a first format between the first and second network nodes. The first network node further includes a processor operatively coupled to the first port, the processor being configurable to receive one or more frames of data and/or transmit one or more frames of data, the frames of data having an overhead processing portion that is otherwise standard. The processor uses only a subset of the overhead processing portion and is configured such that utilizing only the subset of the overhead processing portion of the one or more data frames enables one or more functional blocks to be eliminated from the first network node, the one or more functional blocks being otherwise required for implementing substantially all of the overhead processing portion of the one or more data frames.

In an illustrative embodiment of the invention, a pseudo-SONET protocol is provided for transporting data through a network-based communication system. The pseudo-SONET protocol utilizes only a subset of a transport overhead (TOH) processing portion of a standard SONET frame. In this manner, certain desirable features of the SONET standard, such as, for example, SONET frame loss and frame synchronization, transport link status, bit-interleaved parity (BIP) error information, remote defect indication (RDI), link integrity checking, etc., are supported, without the need for implementing all of the features of the SONET standard. The pseudo-SONET protocol may thus be implemented with substantially less hardware, thereby resulting in a significant reduction in cost compared to a fully compliant SONET architecture.

These and other features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of an illustrative data transport architecture for communicating between two or more nodes in a network-based communication system. It should be understood, however, that the present invention is not limited to this or any particular data transport architecture. Rather, the invention is more generally applicable to any synchronous communications architecture for connecting two or more nodes together in a network-based environment, and that is cost-effective, provides modularity and scalability, and/or provides link reliability features. While reference is made herein to a SONET protocol, the techniques of the present invention are not limited to this protocol or to optical networks, but rather may be similarly employed with other types of networks and network-based communication protocols, as will become apparent to those skilled in the art.

Figure 1:
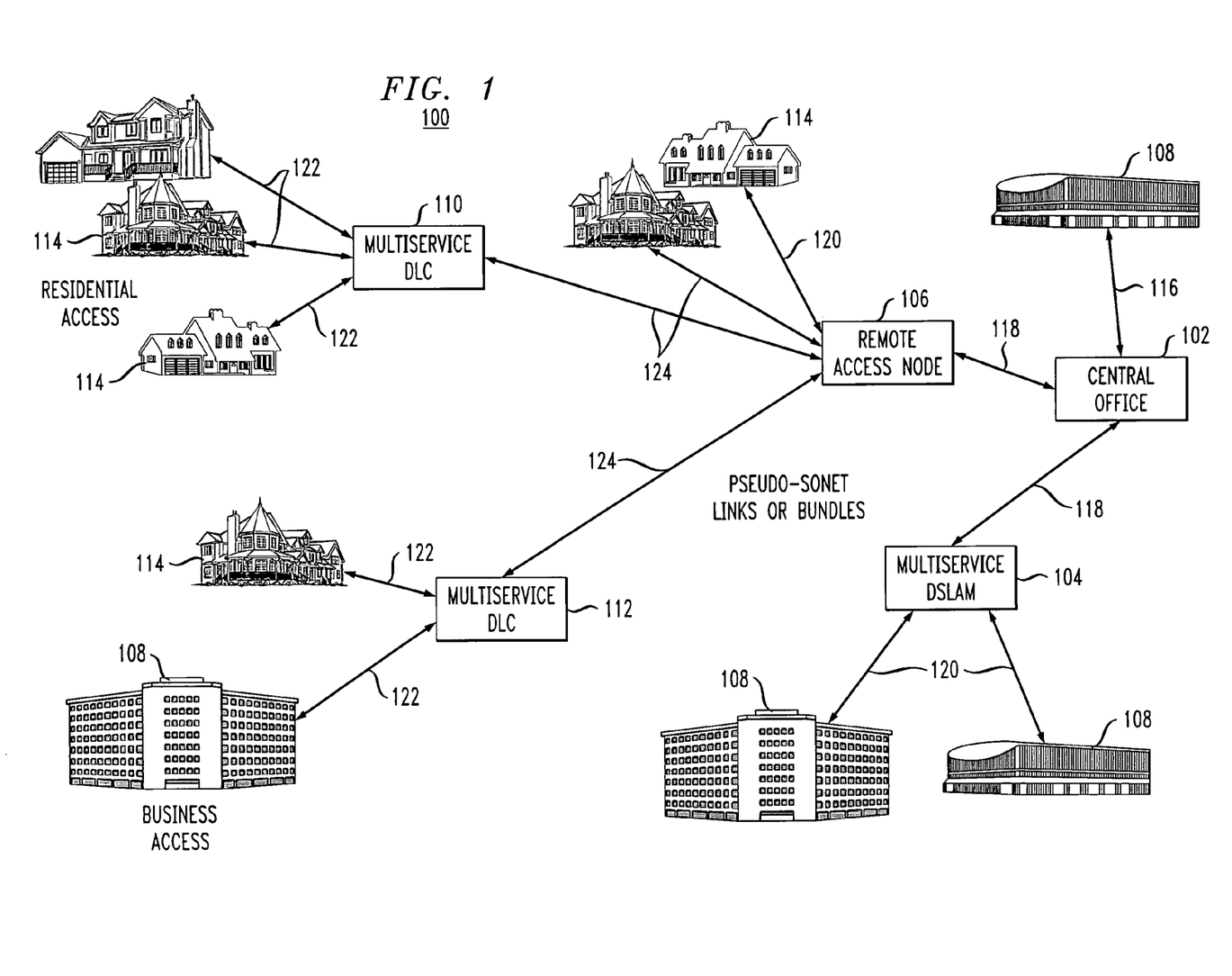
FIG. 1 is a graphical representation depicting an illustrative modular transport architecture in which the techniques of the present invention may be implemented.

FIG. 1 depicts a block diagram of an illustrative modular transport architecture 100 in which the techniques of the present invention may be implemented. The transport architecture 100 provides distributed broadband interconnectivity, for example, between a central office 102 and one or more network nodes, such as, for example, business access nodes 108 and residential access nodes 114. Data may be transported between the central office 102 and a given access node (e.g., 108) directly, such as via a communication link 116. Alternatively, data may be transported between the central office 102 and a given access node indirectly, such as via communication links 118, 120, 122 and/or 124, and one or more remote access nodes 106, one or more multiservice digital subscriber line access multiplexers (DSLAMs) 104, and/or one or more multiservice digital loop carriers (DLCs) 110, 112. In the context of a SONET/synchronous data hierarchy (SDH) system, for example, the physical transmission media (e.g., communication links) may comprise one or more synchronous transport signal (STS) links, optical carrier (OC) links, etc. One or more of communication links 116, 118, 120, 122, 124 are preferably optical links transporting data.

In the SONET/SDH system, the data may be transported between one or more nodes (e.g., 102, 104, 106, 108, 110, 112, 114) in the system using, for example, a Universal Test and Operations Physical-Layer (PHY) Interface for Asynchronous Transfer Mode (UTOPIA) bus. The UTOPIA interface, which is based on the ATM (asynchronous transfer mode) Forum standards (e.g., "UTOPIA, An ATM-PHY Interface Specification," Level 1, Version 2.01, af-phy-0017.000, March 1994, "UTOPIA, An ATM-PHY Interface Specification," Level 2, Version 1.0, af-phy-0039.000, June 1995, "UTOPIA Level 3," af-phy-0136.000, November 1999, and "UTOPIA Level 4," af-phy-0144.001, March 2000, all of which are incorporated by reference herein), has been specifically defined to handle ATM cell-based traffic. Alternative interfaces between the nodes, such as, but not limited to, System Packet Interface (SPI), Packet-over-SONET/synchronous data hierarchy (POS), etc., are similarly contemplated by the invention.

The SONET standard defines a telecommunications protocol for carrying a plurality of signals of potentially different capacities through a synchronous, flexible, optical hierarchy. This is accomplished by means of a byte-interleaved multiplexing scheme. A first step in the SONET multiplexing process involves the generation of a lowest level, or base, signal. In SONET, the base signal is generally referred to as a synchronous transport signal-level 1 signal, or simply STS-1 signal, which is specified to operate at 51.84 megabits per second (Mbps). Higher level signals are integer multiples of STS-1, creating a family of STS-N signals, where N is an integer greater than or equal to one.

Figure 2:
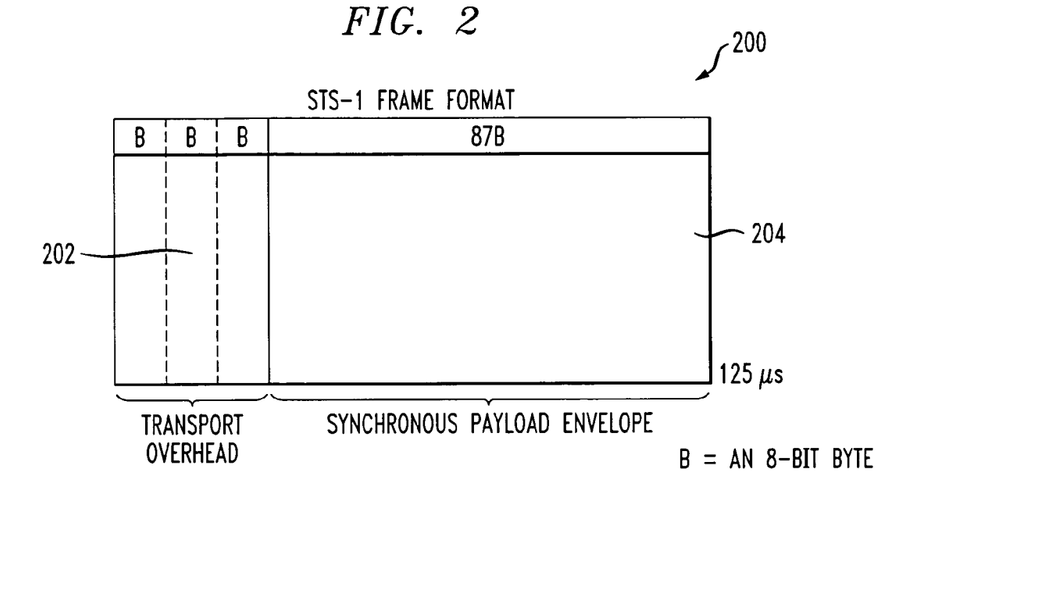
FIG. 2 is a graphical representation depicting a synchronous transport signal-level 1 (STS-1) data frame, in accordance with a SONET telecommunications transport standard.

FIG. 2 illustrates a STS-1 data frame 200, organized in accordance with the SONET standard. As apparent from the figure, the STS-1 SONET data frame 200 consists of ninety columns of bytes and nine rows of bytes in each column. The first three columns define a transport overhead (TOH) portion 202 of the SONET data frame 200, and the last 87 columns constitute a synchronous payload envelope (SPE) portion 204 of the data frame. The STS-1 SONET frame includes a reserved portion in the SPE 204, namely, columns 30 and 59, which are referred to as "fixed stuff" columns and are not used for payload data. Instead, fixed bytes are inserted into these columns of the SPE which are used for control functions (e.g., frame synchronization, rate adaptation, etc.). With a frame length of 125 microseconds (μs), or 8000 frames per second, STS-1 has a bit rate of 51.84 Mbps, as previously stated. The order of transmission of bytes is row-by-row, from top to bottom and from left to right (most significant bit first).

Figure 3:
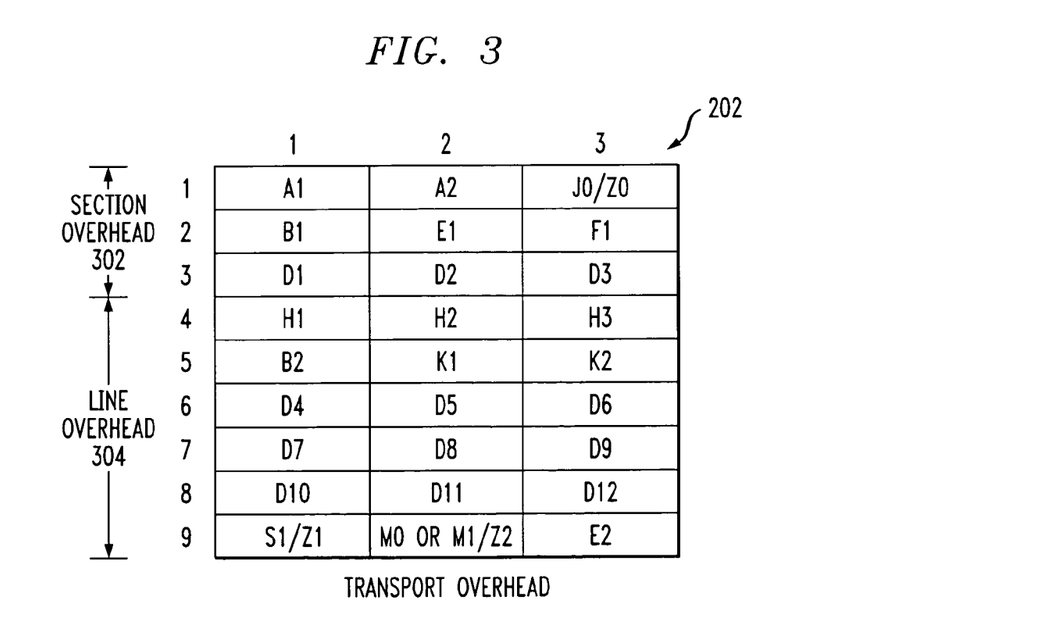
FIG. 3 is a graphical representation depicting a transport overhead (TOH) portion of the STS-1 SONET data frame shown in FIG. 2.

FIG. 3 illustrates the TOH portion 202 of the standard SONET data frame. The TOH portion of the SONET frame comprises a section overhead 302 and a line overhead 304. The section overhead 302 includes the first three rows (e.g., rows 1-3), and the remaining six rows (e.g., rows 4-9) constitute the line overhead 304. At each intersection of a given column and row in the TOH portion of the SONET frame, there resides a byte which relates to a specific function in accordance with a fully compliant SONET standard. For example, the section overhead 302, in order from left to right and beginning from row 1 down, comprises framing bytes A1 and A2, section trace byte J0/section growth byte Z0, section bit-interleaved parity (BIP) code byte B1, section orderwire byte E1, section user channel byte F1, and section data communications channel (DCC) bytes D1 to D3. Similarly, the line overhead 304 comprises STS payload pointer bytes H1 and H2, pointer action byte H3, line BIP code byte B2, automatic protection switching (APS) channel bytes K1 and K2, line DCC bytes D4 to D12, synchronization status byte S1, growth byte Z1, STS-1 remote error indication (REI) byte M0, STS-N REI byte M1, growth byte Z2 and orderwire byte E2.

In accordance with an illustrative embodiment of the invention, in order to reduce the amount and complexity of hardware and/or software required for implementing a fully compliant SONET architecture, a data transport architecture is provided which utilizes only a desired subset of the TOH portion of the SONET data frame, thereby providing a beneficial cost savings. In this manner, certain desirable features of the standard SONET protocol, such as, for example, link reliability status information, can be retained without the need to implement substantially all of the supported features and accompanying hardware of a fully compliant SONET node. Since only a subset of the otherwise standard SONET protocol is used, the illustrative data transport architecture of the invention may be referred to herein as a pseudo-SONET architecture.

By way of example only, a given node in a network-based communication system configurable for implementing a pseudo-SONET protocol in accordance with an illustrative embodiment of the invention preferably utilizes only a portion of the standard SONET data frame, including framing bytes A1 and A2, section user channel byte F1, STS payload pointer bytes H1 and H2, and APS channel byte K2. Framing bytes A1 and A2 are used for detecting the beginning of a valid SONET frame and are preferably fixed to a predetermined bit pattern, such as, for example, 1111 0110 and 0010 1000, respectively. The present invention, however, is not limited to any particular bit pattern or number of bits used for framing. Byte B1 preferably carries the section BIP-8 code, using even parity. Byte B1 may be calculated over all bits of the previous frame after scrambling and placed in the B1 byte of the current frame before scrambling. The section user channel byte F1 is preferably used by the network to determine whether a network switch is directing traffic properly from port to port.

Bytes H1 and H2, if used, are allocated to a pointer that indicates an offset in bytes between the pointer and a first byte of the STS SPE. The pointer bytes are preferably used to align the TOH in a given frame and to perform frequency justification. The H1 and H2 bytes may also be employed to indicate concatenation, and to detect STS path alarm indication signals (AIS-P). Byte K2 may be utilized in the protection line for APS signaling between line terminating equipment (LTE) that use line level protection switching. The K2 byte may also be used to detect line alarm indication signals (AIS-L) and line remote defect indication signals (RDI-L). It is to be appreciated that, depending on the features of the standard protocol desired, the present invention contemplates that a different subset of the SONET TOH bytes may be used or, alternatively, a subset of a different standard network-based communication protocol may be implemented.

Regarding the SPE portion 204 of the STS-1 SONET data frame 200 depicted in FIG. 2, it is to be appreciated that, as previously stated, columns 30 and 59 are designated as fixed stuff columns, as set forth in the SONET standard, and are therefore not available for payload data. However, since the pseudo-SONET architecture of the present invention is not required to be fully compliant with the SONET standard, these fixed stuff columns can be used for payload data, thereby increasing the payload capacity by about 2.3 percent for STS-1. Additionally, because the H1 and H2 pointer bytes are preferably fixed when using the pseudo-SONET architecture of the present invention, one or more functional blocks (e.g., a mapper block) utilized for performing pointer processing in an otherwise fully compliant SONET node may be advantageously eliminated.

Figure 4:
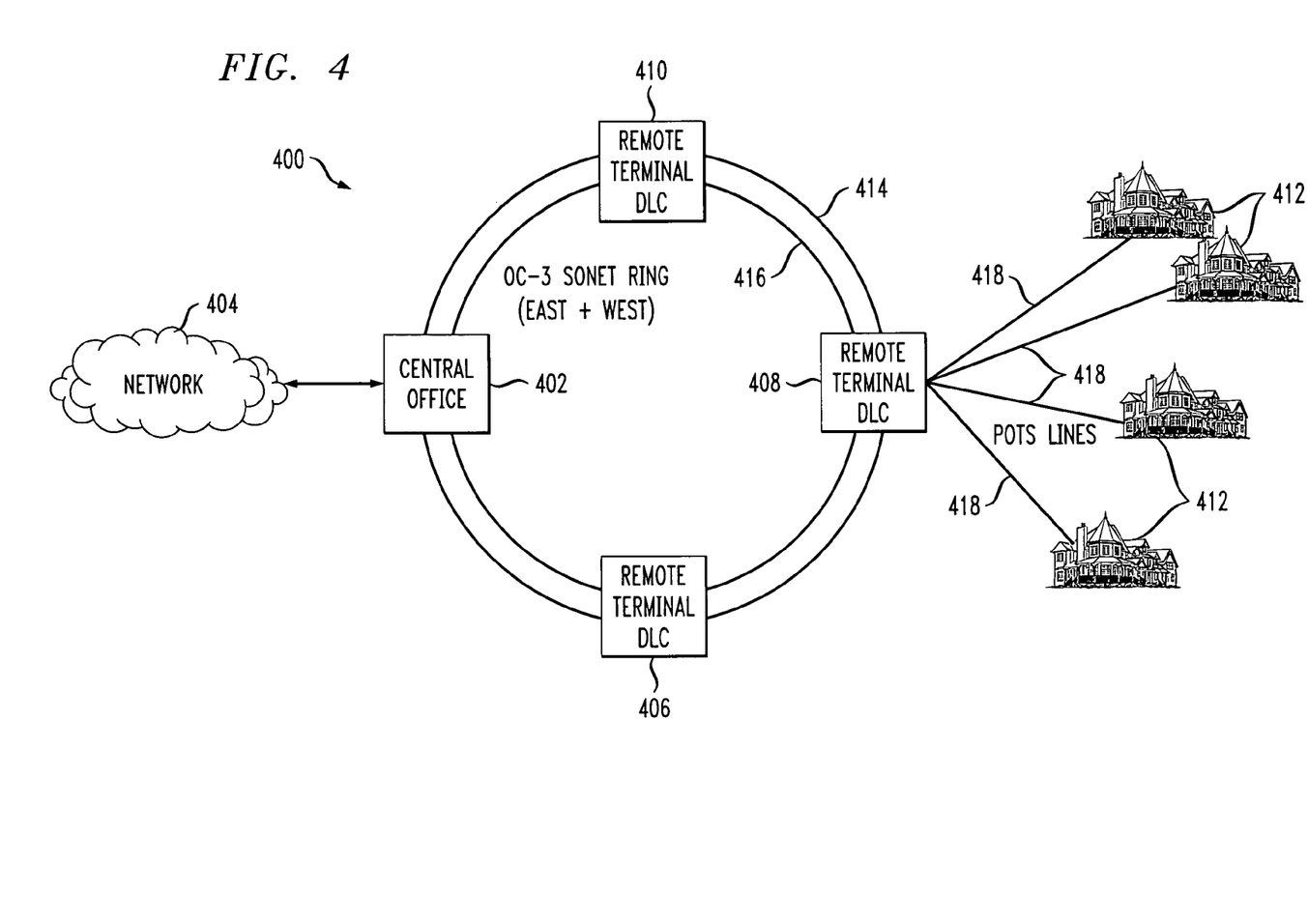
FIG. 4 is a graphical representation depicting at least a portion of an exemplary digital loop carrier (DLC) network in which the techniques of the present invention may be implemented.

FIG. 4 depicts at least a portion of an exemplary digital loop carrier (DLC) network 400 in which the techniques of the present invention may be implemented. The DLC network 400 includes a central office 402 coupled to a network 404. The central office 402 is connected to a plurality of remote terminal DLCs 406, 408 and 410, directly and/or indirectly, in a ring configuration comprising an active ring 414 and a protection ring 416, which may also be referred to as East and West fibers when implementing, for example, an optical carrier (e.g., OC-3) SONET ring. As will be understood by those skilled in the art, the multiple rings 414, 416 may be provided for redundancy. One or more remote terminal DLCs, such as, for example, remote terminal DLC 408, may be connected to a plurality of access nodes, such as, for example, residential access nodes 412, via corresponding plain old telephone service (POTS) lines 418.

Figure 5:
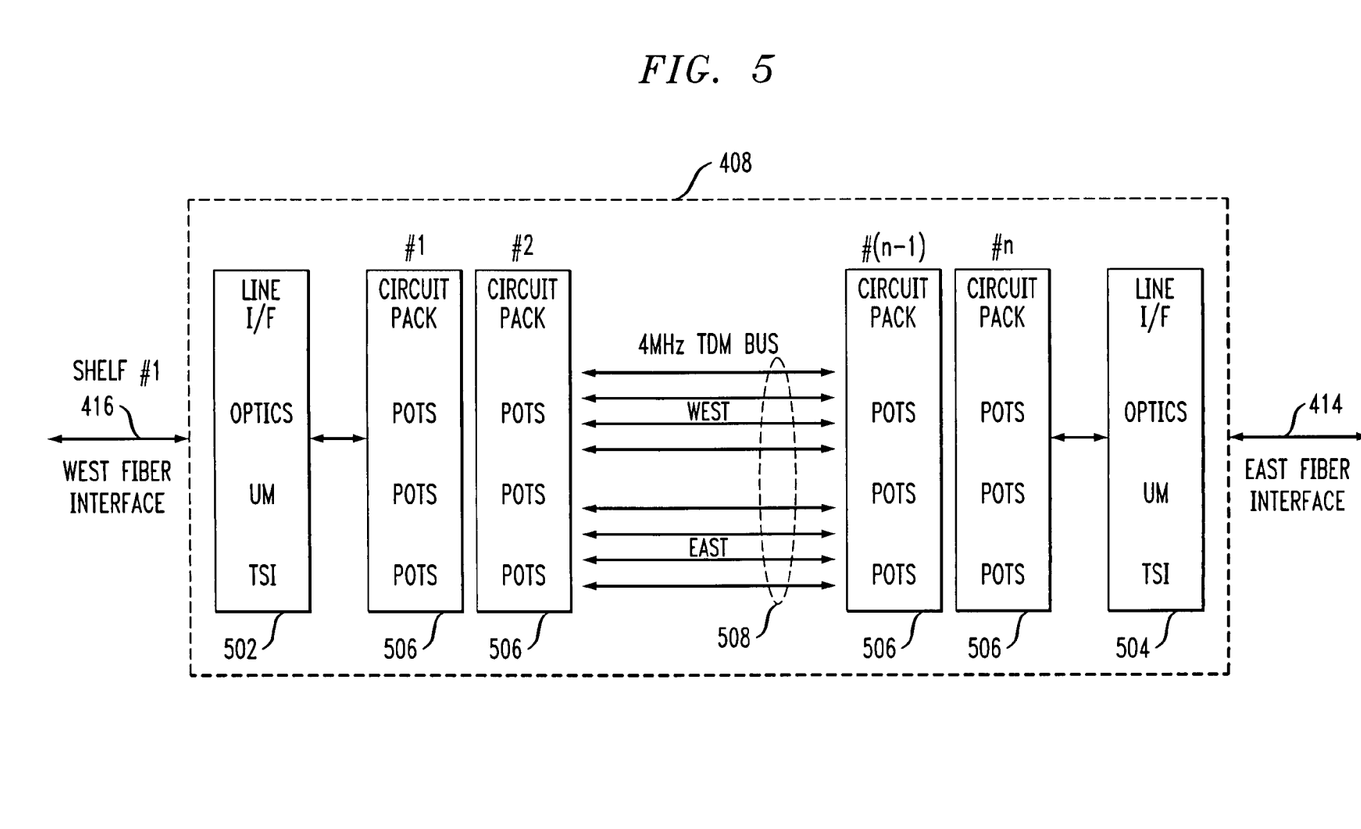
FIG. 5 is a block diagram illustrating an exemplary remote terminal DLC, as may be included in the exemplary DLC network shown in FIG. 4.

FIG. 5 is a block diagram depicting an exemplary remote terminal DLC, as represented by remote terminal DLC 408 shown in FIG. 4. The remote terminal DLC 408 preferably comprises a first line interface card 502, for interfacing with West fiber 416, and a second line interface card 504, for interfacing with East fiber 414. The line interface cards 502, 504 may be connected to a plurality of POTS cards 506 via a time division multiplexing (TDM) bus 508, also referred to as a backplane. Remote terminal DLC 408 includes n POTS cards 406, where n is a positive integer. POTS cards suitable for use with the remote terminal DLC 408 are commercially available, for example, from Lucent Technologies Inc. of Murray Hill, N.J., U.S.A.

Figure 6:
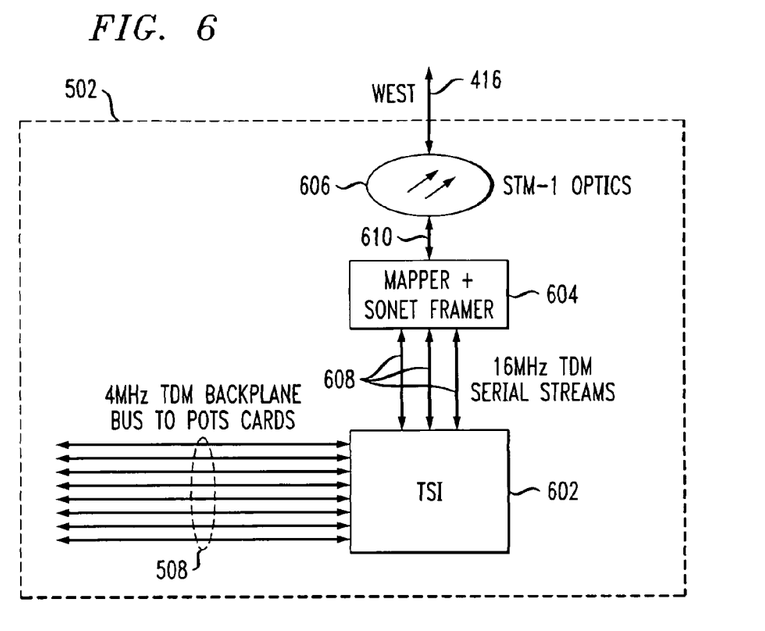
FIG. 6 is a block diagram illustrating an exemplary line interface card, as may be included in the remote terminal DLC shown in FIG. 5.

FIG. 6 illustrates an exemplary line interface card, as represented by line card 502 shown in FIG. 5, which may be employed in the remote terminal DLC 408. The exemplary line interface card 502 includes a time slot interchanger (TSI) 602, a mapper and SONET framer 604, and a synchronous transfer mode-level 1 (STM-1) optical transceiver 606. The POTS data traffic is aggregated from the backplane 508 with the TSI 602. The TSI 602 converts the parallel POTS data traffic into serial data streams, such as, for example, 16 megahertz (MHz) TDM serial streams 608. The serial data streams 608 are mapped into T1/E1 data frames (having data rates of about 1.544 Mbps/2.048 Mbps), which are then wrapped into SONET frames 610 by the mapper and SONET framer 604. The SONET frames 610 are sent onto the optical ring, e.g., via west fiber 416, through the optical transceiver 606. Line interface card 504 is configured in a similar manner for interfacing with the east fiber 414, as shown in FIG. 5.

One of the most costly functional blocks to implement in the line interface card 502 is the mapper and SONET framer 604, which is required in a fully compliant SONET node. By utilizing only a subset of the TOH portion of the SONET frame, as in the case of the pseudo-SONET architecture of the present invention, the mapper and SONET framer 604 can be advantageously eliminated, thereby simplifying the line interface card and providing a substantial cost savings. An exemplary line interface card for implementing the architecture of the present invention is shown in FIG. 7.

Figure 7:
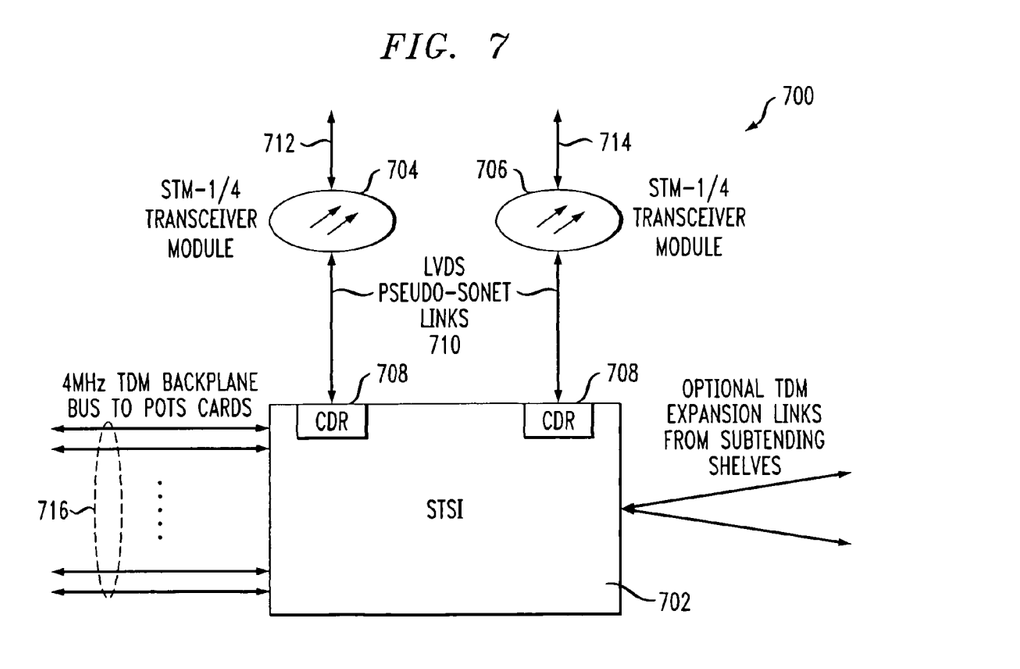
FIG. 7 is a block diagram illustrating an exemplary line interface card, formed in accordance with an illustrative embodiment of the invention.

With reference to FIG. 7, an exemplary line interface card 700 is shown which may be employed in place of line interface card 502 and/or 504 in the remote terminal DLC depicted in FIG. 5. Line interface card 700 preferably comprises a scalable time slot interchanger (STSI), such as, for example, a STSI-144 scalable time-slot interchanger, commercially available from Agere Systems Inc. of Allentown, Pa., U.S.A. Alternative circuitry for serializing and deserializing the outbound and inbound data, respectively, often referred to as SERDES, is similarly contemplated by the invention. Line interface card 700 further includes one or more optical transceivers 704 and 706 coupled to the STSI 702 via corresponding high-speed links (HSLs), such as, for example, low voltage differential signaling (LVDS) pseudo-SONET links 710.

The STSI 702 preferably functions by taking the POTS data traffic aggregated from the backplane 716 and packing this information into the SPE portion of corresponding pseudo-SONET data frames. The pseudo-SONET data frames are sent directly to the optical transceiver(s) 704, 706 via the corresponding pseudo-SONET link(s) 710. The STSI 702 preferably includes clock and data recovery (CDR) circuitry 708 operable for extracting data using a clock signal recovered from the received data frame, with the help of a local reference clock (not shown). Clock and data recovery methodologies suitable for use with the present invention will be known by those skilled in the art. In a pseudo-SONET context, the CDR uses only the A1 and A2 framing bytes for data recovery, unlike SONET which requires additional information, such as, for example, the H1 and H2 bytes, to recover data. Consequently, the CDR circuitry 708 may be implemented in a more cost effective manner compared to CDR circuitry employed in a fully compliant SONET node.

STSI 702 is preferably operable for providing serial-to-parallel demultiplexing for inbound data and parallel-to-serial multiplexing for outbound data (SERDES). Outbound parallel data from interchange fabric included in a centralized switching node, such as, for example, a central office (not shown), may be inserted into pseudo-SONET frames and transmitted over the HSLs. Inbound pseudo-SONET data frames received from the HSLs are preferably stripped of their overhead (e.g., TOH portion), and the data extracted from the SPE portion of the frame is sent to the interchange fabric in parallel. Pseudo-SONET data frames are preferably transmitted to and/or received from optical links 712 and 714 by corresponding optical transceivers 704 and 706, respectively.

Figure 8:
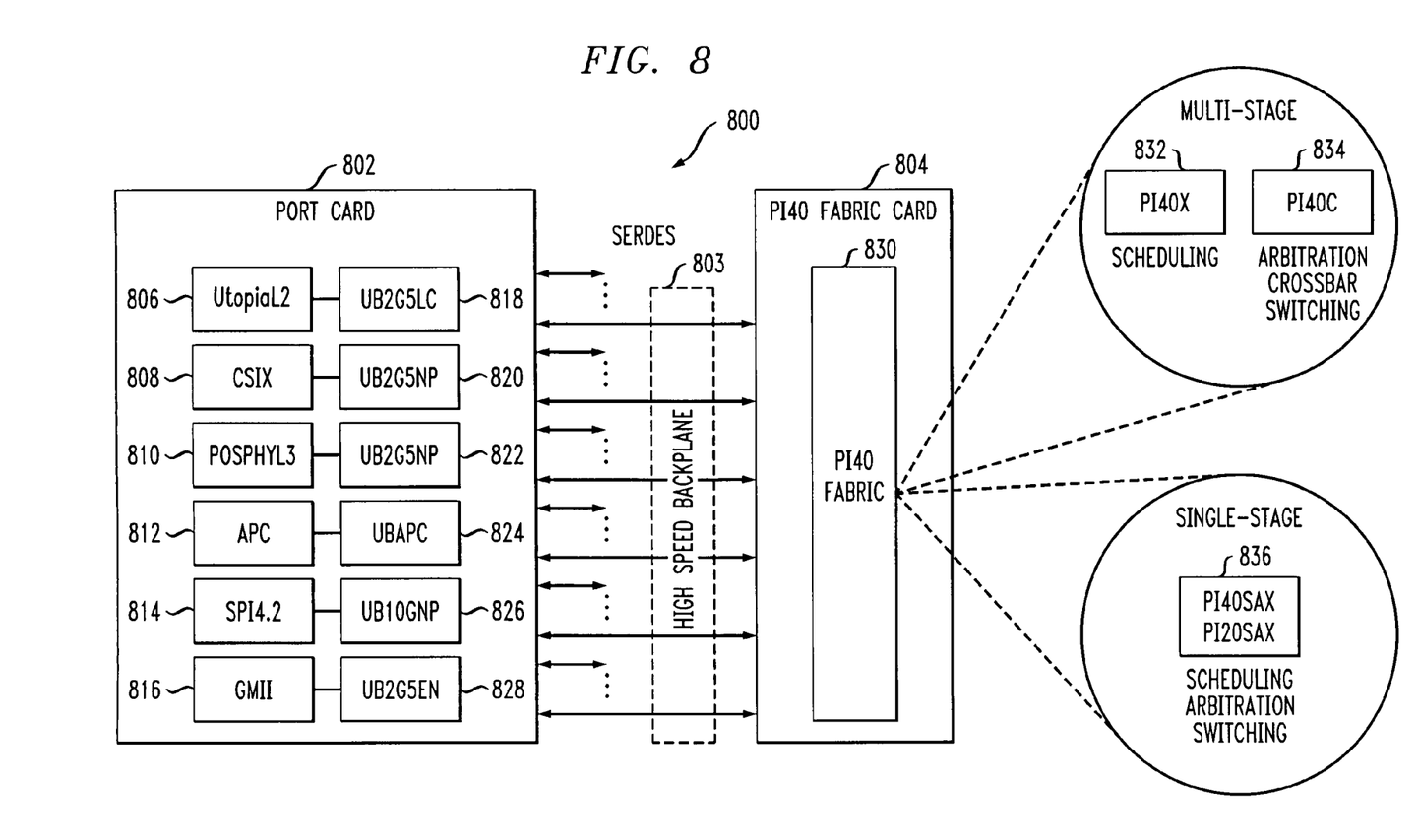
FIG. 8 is a block diagram depicting one implementation of at least a portion of an exemplary modular data transport network, formed in accordance with an illustrative embodiment of the invention.

FIG. 8 depicts one implementation of at least a portion of an exemplary pseudo-SONET modular transport network 800, formed in accordance with an illustrative embodiment of the invention. The exemplary pseudo-SONET transport network 800 comprises a port card 802, which may be included on a line card as part of a remote terminal DLC node, and a fabric card 804, which may be included in, for example, a central office node in the pseudo-SONET network. The port card 802 communicates with the fabric card 804 via a backplane 803 using the pseudo-SONET protocol described herein. Backplane 803 is preferably comprised of electrical links, although optical links and accompanying optical transceivers may be employed for communicating between the port card and fabric card, as depicted, at least in part, in FIG. 7.

The port card 802 preferably includes one or more universal aggregation bridge devices, such as, for example, UB2G5LC 818, UB2G5NP 820 and 822, UBAPC 824, UB10GNP 826, and UB2G5EN 828, all commercially available from Agere Systems Inc. Each of the universal bridge devices included in the port card 802 is configurable for supporting one or more SONET physical layer (PHY) interface devices. For example, UB2G5LC 818 is configured to support a universal test and operations PHY interface for ATM (UTOPIA) level 2 interface 806, UB2G5NP 820 and 822 are configured to support both a common switch interface (CSIX) 808 and a packet over SONET (POS) physical layer 3 interface 810, respectively, UBAPC 824 is configured to support an ATM port controller (APC) interface 812, UB10GNP 826 is configured to support a system packet interface level 4 phase 2 (SPI4.2) interface 814, and UB2G5EN 828 is configured to support a gigabit media independent interface (GMII) 816.

The universal bridge devices 818, 820, 822, 824, 826, 828, preferably communicate with a switch fabric device 830, such as, for example, a PI40 protocol-independent switch fabric, commercially available from Agere Systems Inc., via backplane 803. The switch fabric device 830 is included in the fabric card 804 which may reside in a central office node, as previously stated. In a multistage configuration, the PI40 fabric may comprise a PI40X device 832 operable for performing a scheduling function, and a PI40C device 834, connected to the PI40X, operable for performing arbitration and/or switching functions. In a single-stage configuration, the PI40 device 830 may comprise a PI40SAX device 836 operable for performing scheduling, arbitration and/or switching functions. The PI40X device 832, PI40C device 834 and the PI40SAX device 836 are all commercially available from Agere Systems Inc. The present invention contemplates that other circuitry may alternatively be used for performing the protocol independent switching functions of the fabric card 804.

Figure 9:
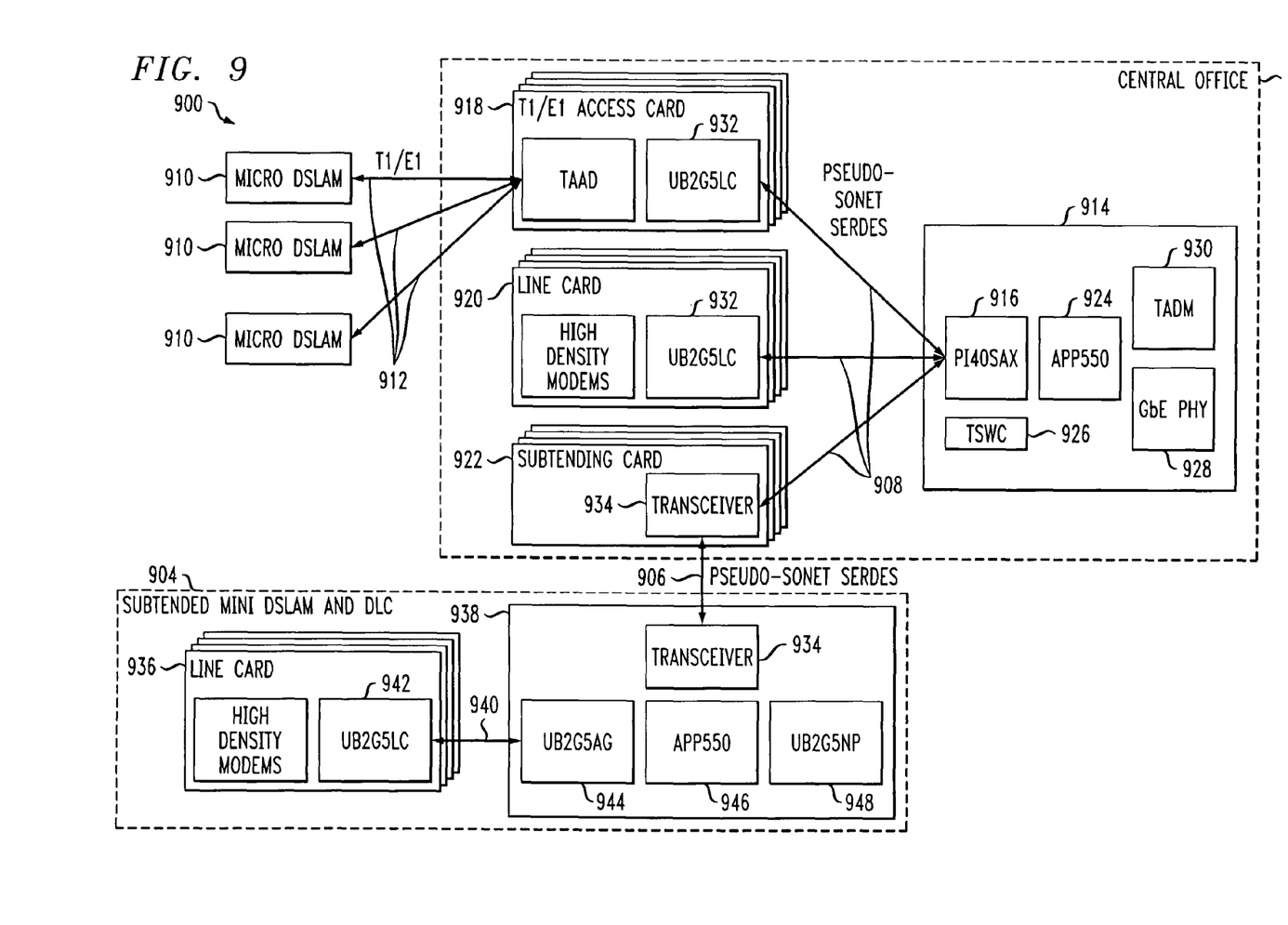
FIG. 9 is a block diagram illustrating at least a portion of an exemplary data transport system in which the techniques of the present invention are implemented.

By way of example only, FIG. 9 is a block diagram illustrating at least a portion of an exemplary data transport system 900 in which the techniques of the present invention are implemented. The exemplary data transport system 900 comprises a central office node 902 operatively coupled to a plurality of micro DSLAMs 910 via corresponding T1/E1 links 912, and to a subtended mini DSLAM and DLC node 904 via a pseudo-SONET SERDES link 906. Each of the micro DSLAMs 910 may include, for example, one or more line interface units (LIUs), a Traffic Analysis and Automated Diagnosis (TAAD) block, one or more high density modems, and a processor (not shown). It is to be understood that while data transport system 900 is shown configured in a tree architecture, the data transport system may alternatively be configured using other architectures, such as, but not limited to, a mesh or ring architecture.

The central office node 902 may include a network switching card 914 comprising, for example, a network processor 924, such as an APP 550 multiservice network processor, commercially available from Agere Systems Inc., and a switching fabric device 916, such as a PI40 protocol-independent switch fabric, also commercially available from Agere Systems Inc. The central office node 902 may also include a clock synthesizer, such as a TSWC02622 clock synthesizer and protection switch, commercially available from Agere Systems Inc., an add/drop multiplexer 930, such as a TADM042G5 add/drop interface, commercially available from Agere Systems Inc., and a Gigabit ethernet physical layer interface 928.

The switch fabric device 916 may be coupled to one or more T1/E1 access cards 918, one or more line cards 920, and one or more subtending cards 922 via corresponding pseudo-SONET links 908. Preferably, each of the access cards 918 and line cards 920 include a universal bridge device 932 for communicating with the switch fabric device 916 in a pseudo-SONET protocol. Each of the subtending cards 922 preferably includes an optical transceiver 934 which functions to format data received from the subtended mini DSLAM and DLC node 904 into a pseudo-SONET protocol for communicating with the network switching card 914.

Subtended mini DSLAM and DLC node 904 may include, for example, one or more line cards 936 and a network bridge card 938. The line cards 936 are preferably configurable for communicating with the network bridge card 938 via a pseudo-SONET link 940. Each of the line cards 936 may include a universal bridge device 942, such as a UB2G5LC, commercially available from Agere Systems Inc. Likewise, network bridge card 938 preferably includes a first universal bridge device 944, such as a UB2G5AG, commercially available from Agere Systems Inc., for communicating with the line cards 936, and a second universal bridge device 948, such as a UB2G5NP, commercially available from Agere Systems Inc., for communicating with the central office node 902 via optical transceiver 934. A network processor 946, such as an APP550 network processor, commercially available from Agere Systems Inc., may be included in the network bridge card 938 at least in part for operatively controlling the formatting of data between the line cards 936 and the central office node 902.

Figure 10:
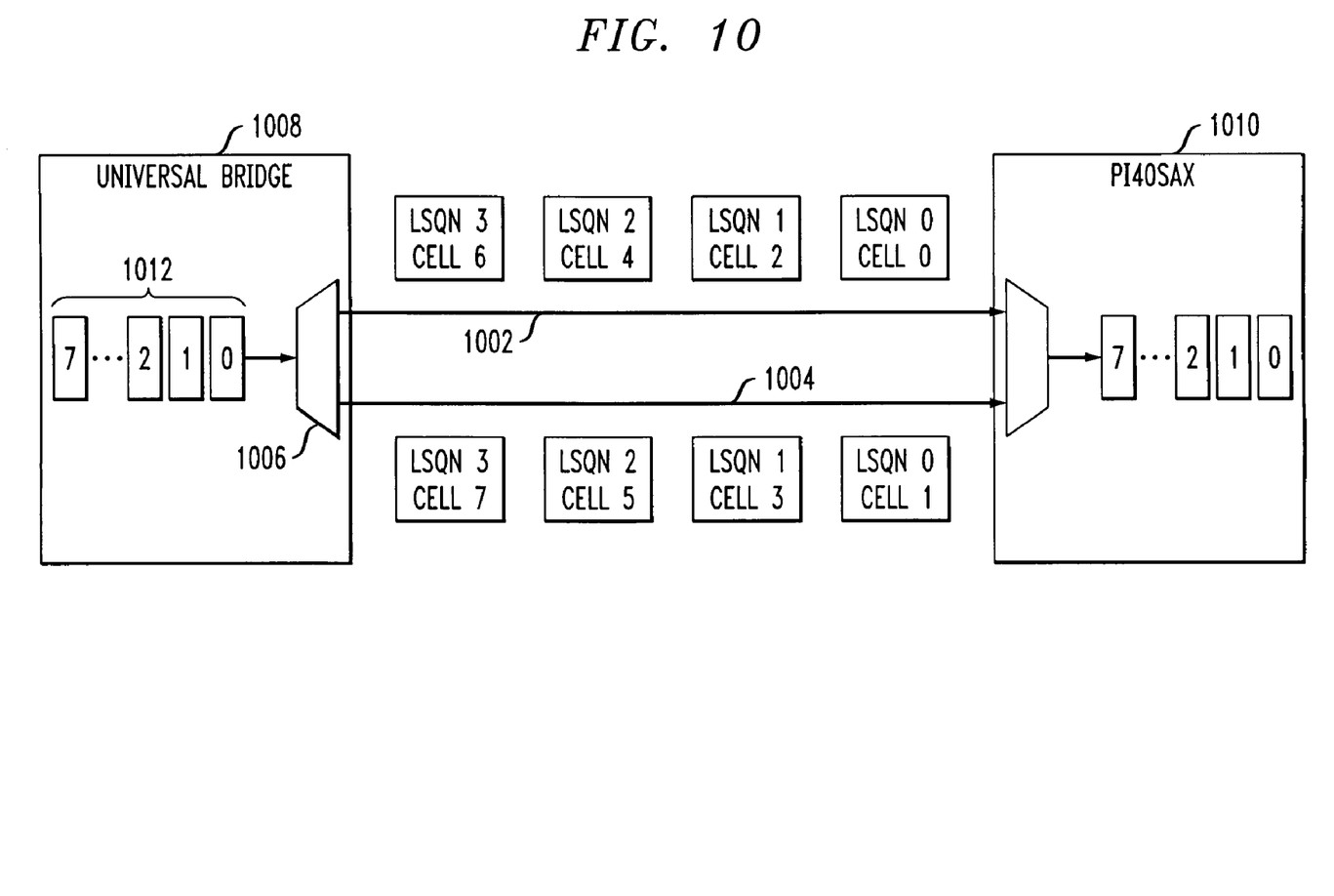
FIG. 10 is a graphical representation depicting a cell stripping feature, in accordance with an illustrative embodiment of the invention.

The network-based data transport system of the present invention is preferably configurable for supporting such features as link bundling in order to provide higher capacity ports. With reference to FIG. 10, to accomplish link bundling, two or more pseudo-SONET SERDES links 1002, 1004 associated with a given port 1006 of a network node are operatively bundled together, although not necessarily in the physical sense, and data is sent across the bundled links 1002, 1004 in a striped manner. Cell striping is one means for reducing latency in the system. Additionally, cell striping ensures that a minimal amount of data is lost should there be a failure in one or more of the links. FIG. 10 depicts cell striping between a first node including a universal bridge 1008 and a second node including a switch fabric device 1010. As apparent from the figure, data, preferably organized into a plurality of cells 1012, is sent across the links 1002, 1004 in an alternating fashion, such that cell 0 is transmitted across link 1002, followed by cell 1 being transmitted across link 1004, followed by cell 2 being transmitted across link 1002, and so on, until all cells have been sent. The data is reconstituted in the correct order in the switch fabric 1010.

The techniques of the present invention, as set forth herein, provide a cost-effective, modular and scalable network-based data transport architecture. By utilizing only a subset of an overhead processing portion of an otherwise standard synchronous communication protocol, the complexity of the hardware and/or software required for transporting data through the network-based communication system can be significantly reduced, thereby providing a beneficial cost savings. Moreover, certain desirable features of the standard protocol may be retained. For example, in the context of a SONET protocol, such features including frame loss and synchronization information, link status, BIP error information, RDI, and link integrity checking, can be advantageously retained without the need for utilizing substantially all of the overhead portion of a given data frame.

At least a portion of the network-based data transport architecture of the present invention may be implemented in one or more integrated circuits. In forming integrated circuits, a plurality of identical die are typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An apparatus for transporting data in a network-based data communication system, the apparatus comprising:
   a first network node comprising:
   a first port couplable to at least a second network node for transferring data in a first format between the first and second network nodes; and
   a processor operatively coupled to the first port, the processor being configurable to at least one of receive one or more frames of data and transmit one or more frames of data, the frames of data utilizing only a subset of a standard overhead processing portion when transferred between the first and second network nodes, the processor being configured such that utilizing only the subset of the overhead processing portion of the one or more data frames enables one or more functional blocks to be eliminated from the network-based data communication system, the one or more functional blocks being otherwise required for implementing substantially all of the overhead processing portion of the one or more data frames.

2. The apparatus of claim 1, wherein the one or more functional blocks to be eliminated comprises at least one of a framer block and a mapper block.

3. The apparatus of claim 1, wherein the data frame comprises a synchronous optical network (SONET) data frame.

4. The apparatus of claim 3, wherein the overhead processing portion of the data frames comprises a transport overhead (TOH) portion of the SONET data frame.

5. The apparatus of claim 1, wherein the first network node further comprises a second port couplable to the processor and to a third network node in the network-based data communication system for transferring data in a second format between the first network node and the third network node.

6. The apparatus of claim 1, wherein the first network node is configured to utilize a reserved portion of a payload envelope portion of the data frame for transporting user data thereby increasing a payload capacity of the data frame, the reserved portion of the payload envelope being otherwise used for control functions.

7. The apparatus of claim 1, wherein the first network node further comprises at least a second port couplable to the processor and to the second network node for transferring data between the first and second network nodes, the processor being operative to selectively partition the data between the first and second ports so as to increase at least one of a data transfer capacity and a reliability of the apparatus.

8. The apparatus of claim 7, wherein the transported data comprises a plurality of sequential data packets in a data stream, the processor being further operative to perform cell striping, whereby successive data packets in the data stream are transferred in an alternating fashion between the first and second ports.

9. The apparatus of claim 1, wherein the first network node comprises at least one of a universal aggregation bridge device configurable for supporting at least one physical layer device couplable to the first network node, and a switch fabric device for performing at least one of data scheduling, arbitration and switching.

10. The apparatus of claim 1, wherein the processor comprises at least one scalable time-slot interchanger operable for converting data between at least one of a serial format and a parallel format.

11. The apparatus of claim 10, wherein the time-slot interchanger comprises clock and data recovery circuitry, the clock and data recovery circuitry being operative to extract data using a clock signal recovered from a data frame received by the first network node.

12. The apparatus of claim 10, wherein the clock and data recovery circuitry is configurable for utilizing only a subset of the overhead processing portion of the received data frame for data recovery.

13. The apparatus of claim 1, wherein the first network node comprises at least one of a line card and a network switching card.

14. The apparatus of claim 1, wherein the first and second network nodes communicate with one another via a backplane comprising at least one of a plurality of electrical links and a plurality of optical links.

15. An integrated circuit including at least one apparatus for transporting data in a network-based data communication system, the at least one apparatus comprising:

a first network node comprising:

a first port couplable to at least a second network node for transferring data in a first format between the first and second network nodes; and a processor operatively coupled to the first port, the processor being configurable to at least one of receive one or more frames of data and transmit one or more frames of data, the frames of data using only a subset of a standard overhead processing portion when transferred between the first and second network nodes, the processor being configured such that utilizing only the subset of the overhead processing portion of the one or more data frames enables one or more functional blocks to be eliminated from the network-based data communication system, the one or more functional blocks being otherwise required for implementing substantially all of the overhead processing portion of the one or more data frames.

16. The integrated circuit of claim 15, wherein the one or more functional blocks to be eliminated comprises at least one of a framer block and a mapper block.

17. The integrated circuit of claim 15, wherein the first network node further comprises a second port couplable to the processor and to a third network node in the network-based data communication system for transferring data in a second format between the first network node and the third network node.

18. The integrated circuit of claim 15, wherein the first network node is configured to utilize a reserved portion of a payload envelope portion of the data frame for transporting user data, thereby increasing a payload capacity of the data frame, the reserved portion of the payload envelope being otherwise used for control functions.

19. The integrated circuit of claim 15, wherein the first network node further comprises at least a second port couplable to the processor and to the second network node for transferring data between the first and second network nodes, the processor being operative to selectively partition the data between the first and second ports so as to increase at least one of a data transfer capacity and a reliability of the integrated circuit.

20. An interface circuit for transporting data in a network-based data communication system between a first network node and at least a second network node, the interface circuit comprising:

a first port couplable to the second network node for transferring data in a first format between the first and second network nodes; and a processor operatively coupled to the first port, the processor being configurable to at least one of receive one or more frames of data and transmit one or more frames of data, the frames of data using only a subset of a standard overhead processing portion when transferred between the first and second network nodes, the processor being configured such that utilizing only the subset of the overhead processing portion of the one or more data frames enables one or more functional blocks to be eliminated from the network-based data communication system, the one or more functional blocks being otherwise required for implementing substantially all of the overhead processing portion of the one or more data frames.

21. The circuit of claim 20, further comprising a second port couplable to the processor and to a third network node in the network-based data communication system for transferring data in a second format between the first network node and the third network node.

22. The circuit of claim 20, wherein the first network node further comprises at least a second port couplable to the processor and to the second network node for transferring data between the first and second network nodes, the processor being operative to selectively partition the data between the first and second ports so as to increase at least one of a data transfer capacity and a reliability of the circuit.

* * * * *